United States Patent
Cassuto et al.

(10) Patent No.: US 8,422,161 B2
(45) Date of Patent: *Apr. 16, 2013

(54) INFORMATION STORAGE DEVICE WITH MULTIPLE-USE FIELDS IN SERVO PATTERN

(75) Inventors: Yuval Cassuto, Sunnyvale, CA (US); Jonathan Darrel Coker, Rochester, MN (US); David Timothy Flynn, Mantorville, MN (US)

(73) Assignee: HGST Netherlands B.V., Amsterdam (NL)

( * ) Notice: Subject to any disclaimer, the term of this patent is extended or adjusted under 35 U.S.C. 154(b) by 453 days.

This patent is subject to a terminal disclaimer.

(21) Appl. No.: 12/653,863

(22) Filed: Dec. 18, 2009

(65) Prior Publication Data

US 2011/0149433 A1    Jun. 23, 2011

(51) Int. Cl.
*G11B 5/596* (2006.01)
(52) U.S. Cl.
USPC ...................................................... 360/77.08
(58) Field of Classification Search ............... 360/77.08, 360/75, 77.05, 77.01, 77.07, 78.01
See application file for complete search history.

(56) References Cited

U.S. PATENT DOCUMENTS

| | | | |
|---|---|---|---|
| 6,078,445 A | 6/2000 | Serrano et al. | |
| 6,967,808 B1 | 11/2005 | Bandic et al. | |
| 7,193,800 B2 | 3/2007 | Coker et al. | |
| 7,342,734 B1 | 3/2008 | Patapoutian et al. | |
| 2008/0266701 A1 | 10/2008 | Albrecht et al. | |
| 2009/0168227 A1 | 7/2009 | Blaum et al. | |
| 2011/0149432 A1* | 6/2011 | Coker et al. | 360/77.08 |
| 2011/0149434 A1* | 6/2011 | Coker et al. | 360/77.08 |

OTHER PUBLICATIONS

Tarciana Lopes, et al. "Quasi-synchronous CDMA system using spreading sequences with zero-correlation zone," *Telecommunications Symposium, 2006 International* Publication Date: Sep. 3-6, 2006 pp. 995-998 (4 pages) ISBN: 978-85-89748-04-9.
"Code division multiple access" Wikipedia article obtained from Internet cite Jul. 10, 2009 (9 printed pages) http://en.wikipedia.org/wiki/Cdma.

* cited by examiner

*Primary Examiner* — Fred Tzeng
(74) *Attorney, Agent, or Firm* — G. Marlin Knight

(57) ABSTRACT

An embodiment of the present invention implements some or all major servo subfunctions for a storage device in integrated servo fields comprising sequences of encoded bits having selected mathematical properties. The integrated servo field is composed of a number of encoded sequences, which are members of a selected sequence set that is constrained to preferably provide some or all of the following functions: the Servo Track Mark (STM), the Position Error Signal (PES) and positional information such as the track-ID. In one embodiment the plurality sequences encoding a location identifier such as a track-ID are distributed across a set of servo wedges. A method of encoding the location identifier using a Chinese Remainder Theorem is described.

19 Claims, 12 Drawing Sheets

Fig. 3

*Length 64 = 4 * 16 pattern cycle:*   M64
/
4215263568958475421526356895847542152635689584754215263568958475

*Length 63 = 3 * 16 + 15 pattern cycle:*   M63
/
421526356895847542152635689584754215263568958475421526356689587̂5

*Length 61 = 16 + 3 * 15 pattern cycle:*   M61
/
4215263568958475421526356895875421526356895875421526356895875̂

*Length 59 = 3 * 15 + 14 pattern cycle:*   M59
/
42152635689587542152635689587542152635689587542152635695875

Patterns are *one-indexed*.

Fig. 7

INFORMATION STORAGE DEVICE WITH MULTIPLE-USE FIELDS IN SERVO PATTERN

RELATED APPLICATIONS

The present application is related to the following co-pending applications, which are commonly assigned and include common inventors:
1) application bearing Ser. No. 12/653,874 having a filing date of Dec. 18, 2009; and
2) application bearing Ser. No. 12/653,862 having a filing date of Dec. 18, 2009.

FIELD OF THE INVENTION

This invention relates generally to information storage systems, and more particularly to servo patterns on recording disks and servo positioning systems that selectively position transducers (heads) over tracks on the disks while the disks rotate.

BACKGROUND

Hard disk drives (HDDs) have one or more disks on which ferromagnetic thin materials are deposited. Information recorded on the disks is generally organized in concentric tracks. As part of the manufacturing process permanent servo information is recorded on the disks that provides information to the system about the position of the heads when the disks are rotating during operation. The servo data on the disk provides several fundamental functions and is typically arranged in four distinct fields that are disposed in sequence along the direction of the tracks. First, it supplies a timing mark (known as the Servo Track Mark (STM) or Servo Address Mark (SAM)) which is used to synchronize data within the servo fields, and also provides timing information for write and read operations in the data portions of the disk. Second, the servo area supplies a 10-30 bit digital field, which provides a coarse track-ID (TID) number and additional information to identify the physical servo sector number. The TID is typically written in Gray code as the presence or absence of recorded dibits. During seek operations, when the head is moving across tracks, the head can typically only read a portion of the Gray-code in each TID. The Gray-code is constructed so that pieces of the TID, in effect, can be combined from adjacent tracks to give an approximate track location during a seek.

Finally, the servo field supplies a position error field, which provides the fractional-track Position Error Signal (PES). Auxiliary functions, such as amplitude measurement or repeatable run-out (RRO) fields are sometimes also used. During read or write operations the drive's servo control system uses the PES servo information recorded on the disk surface as feedback to maintain the head in a generally centered position over the target data track. The typical PES pattern is called a quad-burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerline of a tracks. The quad-burst pattern is repeated for each set of four tracks, so only local information is provided. Each servo wedge has four (A,B,C, D) sequential slots reserved for PES bursts. Each track has a centered PES burst in only one of the four slots. Each burst is centered on a selected track, but its width extends to the centerline of adjacent tracks. Thus, when the head is centered over a selected track, it will detect the strongest signal from a burst centered on the selected track, but it will also detect a weaker signal from bursts on the adjacent tracks. For example, when the head is centered over a track with a burst in the A-position, it might also detect a subsequent weak B-burst on the adjacent track on the right and then a weak D-burst from the adjacent track on the left. When the head passes over the PES pattern, the bursts that are within range generate an analog signal (waveform) that indicates the position of the head over the disk and is used as feedback to adjust the position of the head. Variations of the standard quad-burst pattern described above include use of two conventional, single frequency, quad burst servo patterns interspersed with dual frequency, dual burst servo patterns as described by Serrano, et al. in U.S. Pat. No. 6,078,445.

With relatively minor variants throughout the industry, the implementation of each of these servo functions has remained relatively unchanged since the advent of PRML recording technologies allowed digital signal processing techniques to be applied to the servo problem. Each of these functions typically consumes a relatively independent portion of the servo wedge in prior art servo systems.

The overhead on the disk to support these functions is a large factor in the drive's format efficiency. Typically, the servo fields can consume between 5% and 10% of the recording surface of the disk. As areal density gains in the magnetic and data signal processing components become harder and harder to achieve, the servo overhead becomes a more and more attractive target for reduction, and relief of necessary areal density targets to achieve particular HDD capacity points. The invention described herein provides a significant reduction in the servo overhead as compared to prior art systems.

U.S. Pat. No. 6,967,808 to Bandic, et al. describes a servo pattern having pseudo-random binary sequences for the servo information used to control the position of the recording head. A first pseudo-random binary sequence (PRBS) and a second PRBS identical to the first PRBS but shifted by a portion of the period of the first PRBS are located between the track boundaries in alternating tracks in a first region of the servo pattern and between the track centers in alternating tracks in a second region spaced along the track from the first region. A servo decoder of the invention has two correlators, one for each PRBS. Each correlator outputs a dipulse when its PRBS repeats. The difference in amplitude of the dipulses represents the head position signal. The dipulses also control the amplifier for the signal read back by the head and the timing of the track-ID (TID) detector. The AGC, STM and PES fields in the prior art are replaced by a pseudo-random binary sequence (PRBS) field. The TID field, which is not included in the PRBS, is encoded twice using non-return to zero (NRZ) encoding, which results in a smaller field and is more efficient than the prior art dibit encoding method used for Gray codes. The PRBS fields are also written using NRZ encoding. The first TID field is located between the two PRBS fields. In the preferred embodiment described the two PRBS sequences are formed by taking a PRBS and the same PRBS cyclically shifted by a portion of its period, preferably approximately one-half its period. This cyclic shift means that when the original sequence is input to the correlator matched to the shifted sequence there will be no output over a window with width equal to approximately half the sequence length, and vice versa. Over this range of lag values the two sequences are said to be orthogonal. One sequence (PRBS1) is referred to as the A/C sequence because it encodes both the A-burst and C-burst PES functions. The other sequence (PRBS2) is referred to as the B/D sequence because it encodes both the B-burst and D-burst PES functions.

Related prior art includes U.S. Pat. No. 7,193,800 to Coker et al. which describes the use of particular pseudo-noise (PN) or pseudo-random sequence fields for the purpose of PES and rudimentary TID detection. The AGC, STM, TID, and PES fields in the prior art are replaced by a pair of pseudo-random binary sequence (PRBS) fields. The two PRBS fields in a servo track are identical, but the PRBS fields in adjacent tracks are different. One set of alternating tracks uses a leading pseudo-random binary sequence (PRBS), which is a pseudo-noise sequence with good autocorrelation properties, and a following PRBS that is cyclically shifted from the leading PRBS. A second set of alternating tracks interleaved with the first set also has a leading PRBS and a following PRBS that is cyclically shifted from the leading PRBS, but the leading PRBS in each of the tracks in the second set is offset along-the-track from the leading PRBS in the tracks of the first set. The head positioning control system uses the leading PRBS to generate a servo timing mark (STM), the cyclic shift to generate track-ID (TID), and the following PRBS from adjacent tracks to generate the head position error signal (PES). The first PRBS field in alternate tracks (e.g., the odd servo tracks) are offset from the first PRBS field in the other tracks (i.e., the even servo tracks). The first or leading PRBS field on a servo track serves as the STM. The STM provides a reference for windowing the second PRBS field which is used to encode both the TID and the PES. The TID is encoded in the circumferential phase relationship due to a cyclic shift between the first PRBS field and the second PRBS field. The cyclic shift between the leading and following PRBS increases by a fixed increment with each track in the radial direction so that the length of the cyclic shift between the leading and following PRBS in each track represents the TID. The PES is derived from the relative contributions of the second or following PRBS field from the different servo tracks as the read head crosses adjacent servo tracks in the radial direction. The difference in amplitude of the dipulses from detection of the following PRBS in two adjacent tracks represents the PES sent to the disk drive actuator to maintain the head on track.

Published US patent application 20090168227 by Blaum, et al. describes a method of distributed track-ID in which first and second portions of a track-ID are physically separated in a disk sector. Each of the portions of the track-ID is encoded using a Gray code.

Theoretical concepts from wireless communication techniques, such as Code Division Multiple Access (CDMA) can also be drawn upon for application to HDDs, but the problems in HDD imposes quite different constraints and require substantially different sequence sets. CDMA is a spread spectrum technology, which allows variable data streams for multiple users to co-exist at the same time in a given frequency band. CDMA assigns unique codes to each user's data stream to differentiate it from other streams. The sequence types used in CDMA and other advanced wireless communication techniques employ orthogonal sequence sets which maintain their orthogonality under cyclic extension and nonzero relative lag times. These sets are variously known as loosely-synchronous sets or zero correlation zone sets in the literature.

SUMMARY OF THE INVENTION

An embodiment of the present invention implements some or all major servo subfunctions for a storage device in integrated servo fields comprising sequences of encoded bits having selected mathematical properties. The integrated servo fields can be periodically arranged on the disk in servo wedges with variable user data being recorded between the servo wedges as in the prior art. The integrated servo field is composed of a number of encoded sequences, which are members of a selected sequence set that is constrained to preferably provide some or all of the following functions: the Servo Track Mark (STM), the Position Error Signal (PES) and positional information such as the track-ID. The juxtaposition of sequences in the servo wedges is additionally constrained to increase the detectability of the contribution of adjacent sequences in the read signal. The integrated servo fields provide a Position Error Signal (PES) in relation to the center of a data track through the amplitude of the signal read for adjacent sequences.

In one embodiment each integrated servo field is composed of sequences that are one-half as wide as the data track. In another embodiment each integrated servo field is composed of sequences, each as wide as the data track, that are written in tandem with at least one of the sequences being offset from the data track centerline by one half the width of the data track.

The sequence sets are mathematically constrained such that the integrated field preferably provides the basic servo functions as follows:

1. Each sequence can preferably act as a Servo Track Mark (STM). Each sequence in the set has sufficient aperiodic autocorrelation properties such that the output of an optimum matched filter gives unambiguous location information.

2. The sequences are arranged in patterns in the servo wedges to encode digital location information such as the track and sector IDs (location identifiers). The permitted sequence combinations are mapped to an integer set, which provides the digital positional information.

3. PES is determined from the relative amplitudes of the adjacent (cross-track) sequences which are present in the head signal at the time of the STM.

Constraint (2) above differs substantially from other digital signaling techniques, such as standard orthogonal-message signaling, in benefiting from having more than one sequence (message) present at one time in the read signal. This digital technique also allows the continuous ("analog") estimation of the PES using relative amplitudes of the sequences. As laid out on the disk, adjacent sequences (in the cross-track direction) are selected to be mathematically orthogonal, that is, their dot product is zero.

One embodiment includes HDD-specific constraints to produce novel sequence sets which are particularly useful and efficient in HDD applications, as compared to relatively standard sequence sets from advanced wireless communication methods. The resulting sequence sets generally allow very efficient implementations of the resulting set of filters in the read channel and results in a system which is insensitive to servowriter phase errors, to DC head signal shifts, and to the most significant types of head nonlinearity.

In an alternative embodiment location identifiers such as the track-ID are distributed across multiple servo wedges. This embodiment greatly improves the implementation efficiency of the system by limiting the number of sequences needed to support the full stroke of the HDD. Some embodiments of the invention use a method for mapping the sequences detected in a selected number of consecutive servo wedges to the overall location of the head on the disk. Within the method of the invention many such mappings are possible. For example, one embodiment employs a mapping based on the Chinese Remainder Theorem.

BRIEF DESCRIPTION OF THE FIGURES

FIG. 3 shows six sequence sets of nine exactly DC-free length 12 sequences according to an embodiment of the invention.

FIG. 7 is an example of sequence cycles for a 4-wedge distributed track-ID embodiment of the invention using a Chinese Remainder Theorem encoding.

DETAILED DESCRIPTION OF THE INVENTION

An advantage of the invention is a marked reduction in the size requirement of each servo wedge compared with prior art servo systems. Some experiments indicate that reductions from 5 to 10 times are possible. The system also maintains the size advantage while simultaneously reducing the native phase-error and frequency requirements of the servowriter.

The invention is more efficient than prior art methods because it uses a single integrated servo field with multiple functions. The invention is an improvement over the prior art methods that are essentially only workable as PES fields, with perhaps 1 bit of STM or track-ID, and then only using a particular sequence type (one of the pseudo-noise (PN) or pseudorandom sequences). The present invention allows a solution that includes multiple effective track-ID (TID) bits and a full sequence set instead of a single antipodally-used sequence of the prior art.

The concepts of the invention will be described in four major sections. Embodiments of the basic sequences and sequence sets used in the invention will be described first. The sequence sets and the corresponding set of filters essentially specify the Servo Track Mark (STM) function. Second, methods will be described for arranging such sequence sets on the disk in such a way that digital positional information (such as track or sector ID) and PES may be encoded. Third, methods are described for distributing and coalescing digital location information across multiple servo wedges. Finally, detection and signal processing aspects of the invention are discussed.

A basic building block of the invention is the design of an underlying sequence set from which the integrated servo fields are built. The arrangement of the sequences in the servo wedges encodes desired digital location information such as the track and sector number while also supplying an analog PES for fractional track positioning.

Figure 11:
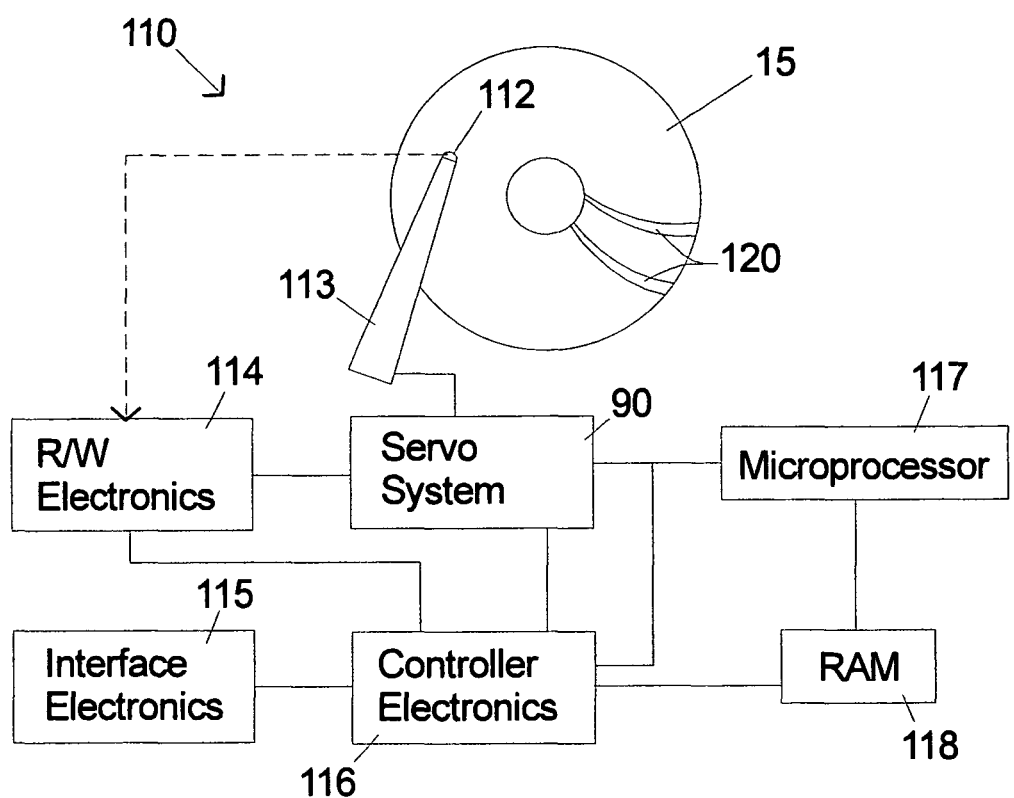
FIG. 11 is a block diagram illustrating a disk drive system according to an embodiment of the invention.

FIG. 11 is a block diagram illustrating an information storage system (disk drive) 110 according to an embodiment of the invention. The disk drive includes data recording disk 15, actuator arm 113, and read head 112 that are arranged in conventional manner. A write head (not shown) will also be included in the same package with the read head. The servo system 90, read/write electronics 114, interface electronics 115, controller electronics 116, microprocessor 117, and RAM 118. The basic system components are generally according to the prior art except as described herein. A disk drive can include multiple disks stacked on a hub that is rotated by a disk motor, with a separate heads for each surface of each disk.

The term servo wedge 120 will be used to mean the contiguous set of integrated servo fields extending from ID to OD on the disk. As in the prior art, a disk 15 according to the invention will typically have multiple servo wedges 120 arranged radially across the disk, but only two are shown.

Figure 1A:
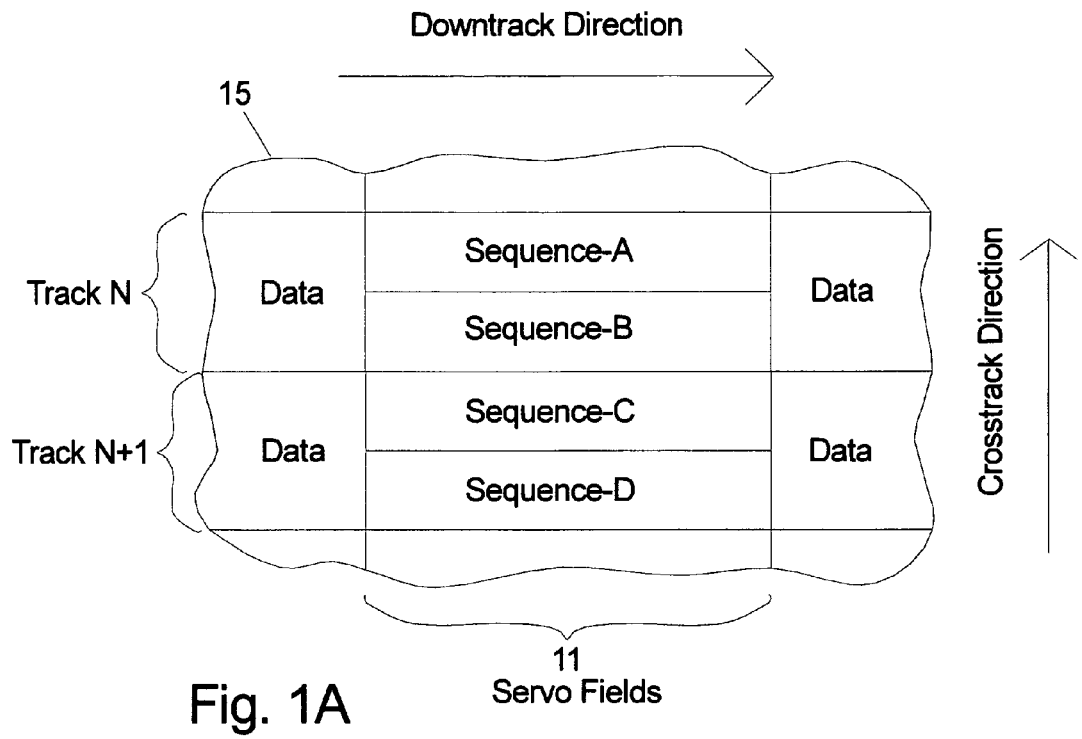
FIG. 1A is an illustration of an embodiment of adjacent integrated servo fields on a disk according to the invention.

FIG. 1A is an illustration of an embodiment of integrated servo fields 11 on a disk 15 according to the invention. Only a small portion of two data tracks are shown. Many thousands of tracks typically appear on a disk in an HDD. The width of the data tracks is the width of the data that is written by the heads (not shown) in the HDD. The effective reading width of the head may be slightly less than the writing width. Only four sequences (A-D) are shown in this illustration, but a practical embodiment will include a larger number of sequences as will be described below. In this embodiment the width of the encoded sequences A-D is one half of the data track width. The sequences A-D are preferably written by a servowriter as a part of the manufacturing process. The width of the sequences A-D is equivalent to the servo track pitch.

The effective reading width of the read head in this example is, therefore, approximately equal to or slightly less than the combined width of 2 encoded sequences. The read signal will, therefore, necessarily include contributions from at least two encoded sequences. The sequences are selected and arranged on the disk to facilitate decoding of adjacent sequence contributions in the read signal. An integrated servo field for track N is composed of encoded sequences A and B, which are members of a selected sequence set. Similarly integrated servo field for track N+1 is composed of encoded sequences C and D, which are also members of the selected sequence set.

Figure 1B:
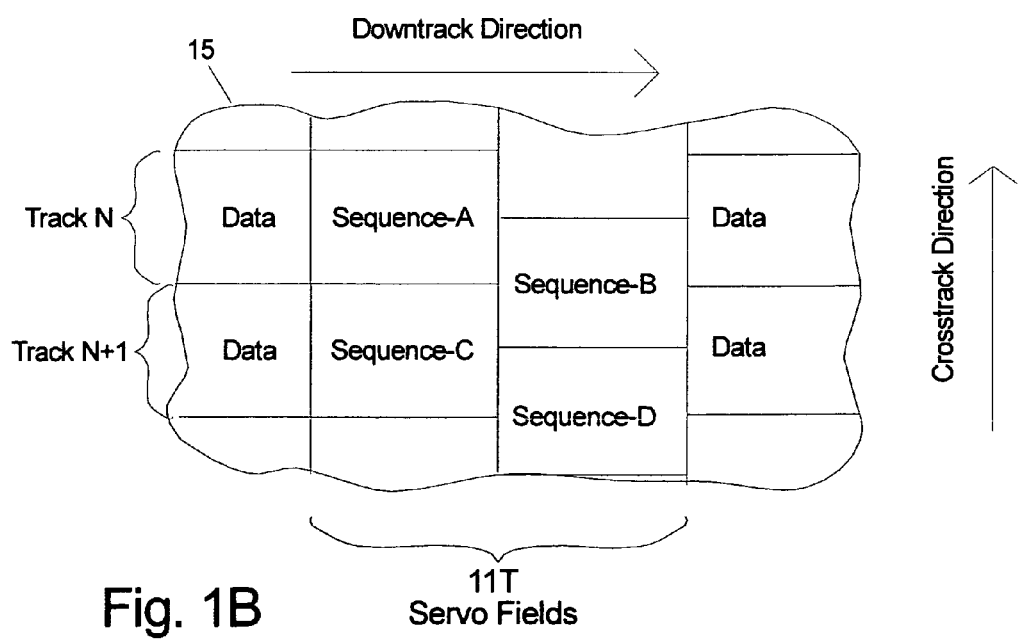
FIG. 1B is an illustration of an embodiment of integrated servo fields in a tandem/offset arrangement on a disk according to the invention.

FIG. 1B is an illustration of an alternative embodiment of integrated servo fields 11T on a disk 15 according to the invention. In this embodiment the width of the encoded sequences A-D is equal to the data track width. Sequences A and B for track N are written in tandem with sequence B being offset by one-half the width of a data track.

Figure 1C:
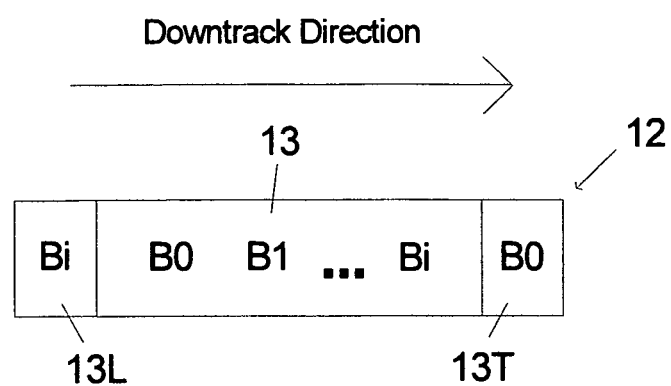
FIG. 1C is an illustration of an embodiment of an extended sequence for use in an integrated with servo field with redundant leading and trailing bits according to the invention.

FIG. 1C is an illustration of an embodiment of an extended sequence 12 that can be used in either of the embodiments described above. Extended sequence 12 consists of a sequence 13 of bits $B_0$ through $B_i$ which are determined by the method which will be described in detail below. Also shown are optional leading and trailing redundant bits 13L, 13T which are duplicates of $B_i$ and $B_0$ respectively. Thus, leading redundant bits 13L is a duplicate of $B_i$ which is the last bit in sequence 13. Trailing redundant bits 13T is a duplicate of $B_0$ which is the first bit in sequence 13. The alternative embodiment, which represents a cyclic extension of the sequence 13, will be called an extended sequence. The additional redundant bits improve the detectability of the sequence due to special sequence properties described below.

Sequence Sets

Although particular preferred embodiments described below apply several constraints to the sequence set which are particularly useful for HDD applications, other embodiments of the invention need not include these constraints. For HDD applications the constraints adopted for the described embodiments are:

1. Each sequence in the sequence set must be writeable or otherwise storable in magnetic media. Bipolar binary (+1, −1) sequences match this constraint for conventional recording. Unipolar binary (1, 0) sequences are appropriate for DC-magnet servowriting systems currently under consideration for Bit-Patterned Recording (BPR) or Discrete Track Recording (DTR). There is no fundamental reason why the sequences have to be binary, so they could in principle be made ternary or even real-valued. For example, embodiments can include ternary (+1, 0, −1) sequences, from a combination of the binary and unipolar options. The particular embodiments and examples described herein use the bipolar binary constraint.

2. Each sequence in the set should be reasonably DC-free as recorded on the disk; i.e., extreme sequences of bits should be avoided. Preferably each sequence should sum to approximately zero. This property reduces sensitivity, in the matched filter detection banks in the read channel hardware, to low-frequency problems in perpendicular magnetic recording system or AC coupling poles, and eliminates static DC offset problems in the arm electronics (AE) and channel electronics.

3. As laid out on the disk, adjacent sequences (in the cross-track direction) are selected to be orthogonal, that is, their dot product is zero. This means that the analysis matched filters corresponding to these sequences do not interfere with each other. This allows desired sequence to be separated out from other sequences present in the read signal using the filters in the read channel hardware. An important distinction between this constraint and that of standard orthogonal sequence sets is that only those sequences which are adjacent on the disk must be necessarily mutually orthogonal, i.e. the sequence set can contain members that are not mutually orthogonal. The combination of constraints (1) and (3) means that exactly one half of the sequence components (bits) change from track to track, which limits the PES-dominating cross-track transition noise. Finally, the combination of (2) and (3) means that second-order head nonlinearities do not affect the analysis filter outputs.

4. Adjacent sequences on the disk are constrained to be orthogonal under cyclic extension and time shifts up to a selected parameter which will be called "tau." This property will be called the plesiosynchronous property. Plesiosynchronous will be used as synonymous with "loosely synchronous" and plesiosynchronous sequence sets are "zero correlation zone" sequence sets.

This property provides insensitivity to phase error in the servo-writing process, improves the autocorrelation properties of each sequence for STM purposes, and is useful as a signal processing check in the detection electronics.

Those skilled in the art will note that obvious changes to these constraint details may lead to other types of sequence sets which are within the scope of this invention.

Figure 2:
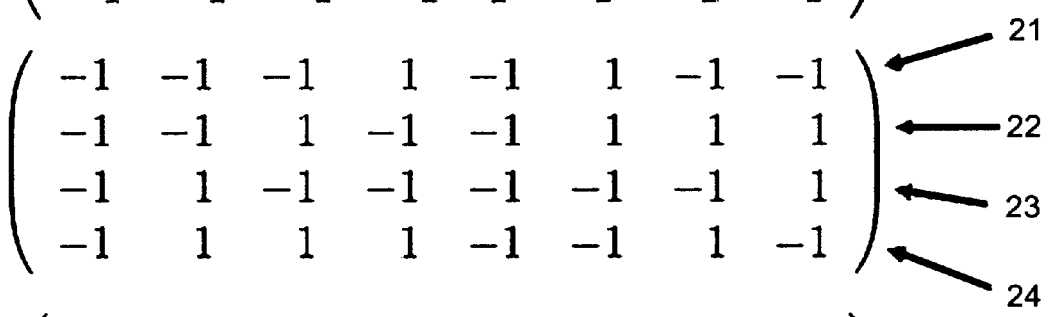
FIG. 2 shows the four binary, mutually plesiosynchronous sequence sets of length 8 with tau=1 according to an embodiment the invention.

Once the number of bits in a sequence is selected, application of the 4 constraints listed above generates a novel family of sequence sets, which can be found in a straightforward way by exhaustive computer search. Four of the simplest such sets (enclosed in parentheses) with a length of 8 bits are shown in FIG. 2. These sequences are not strictly DC-free, but each sequence has at least 2 bits of opposite sign so that the sequences sum to a max of +/−4. FIG. 2 shows the four binary, mutually plesiosynchronous sequence sets of length 8 with tau=1. In the special case of the sequence sets of FIG. 2, all sequences in the set are mutually orthogonal, and remain orthogonal under a cyclic shift of 1 unit. Each sequence is shifted one unit with respect to all other sequences. An antipodal sequence is obtained by inverting each of the bit values in the sequence. Because the antipodal sequences of each set are usable, there are a total of 8 sequences available for use in the integrated servo field in this example. This point will be discussed in more detail below.

TABLE 1

Orthogonal Relationships for Length 8 Sequences from Set 3 in FIG. 2. Antipodal sequences are designated with "^" overscores.

| Seq. # | 1 | 2 | 3 | 4 | 1̂ | 2̂ | 3̂ | 4̂ |
|---|---|---|---|---|---|---|---|---|
| 1 |   | * | * | * |   | * | * | * |
| 2 | * |   | * | * | * |   | * | * |
| 3 | * | * |   | * | * | * |   | * |
| 4 | * | * | * |   | * | * | * |   |
| 1̂ |   | * | * | * |   | * | * | * |
| 2̂ | * |   | * | * | * |   | * | * |
| 3̂ | * | * |   | * | * | * |   | * |
| 4̂ | * | * | * |   | * | * | * |   |

The constraint that a sequence and its negative (antipodal sequence) cannot be adjacent in a servo wedge on the disk avoids null-signal conditions which are not appropriate for positive STM detection. Antipodal sequences are permissible and commonly-used in PES-only applications such as one-step PES and null-phase PES. The resulting adjacency constraints, in addition to any plesiosynchronous constraints arising from the 3rd sequence set in FIG. 2 as an example, are shown in Table 1. The 4 sequences 21, 22, 23, 24 of the third sequence set in FIG. 2 are listed as sequence numbers 1 through 4 respectively, and their 4 corresponding antipodal sequences are represented with "^" symbols. The presence of "*" in the cells means that the two sequences may be adjacent on the disk. No sequence is orthogonal to itself or its antipodal sequence, but otherwise in this example all sequences are orthogonal to each other and can be adjacent on the disk.

Figure 3:
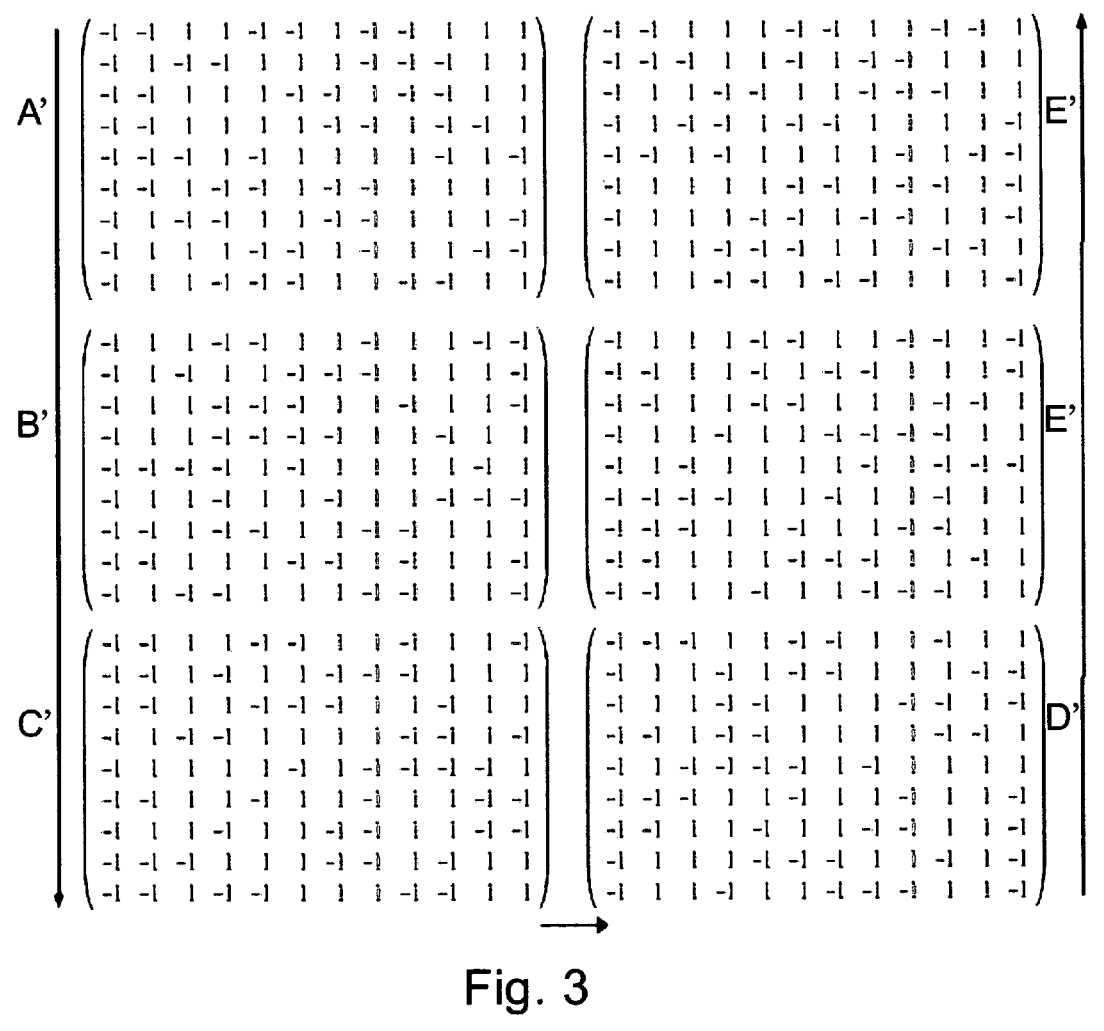

FIG. 3 shows a more complex example of computer-generated sequence sets, in which not all of the sequences in the set are mutually plesiosynchronous. In FIG. 3 there are 6 sequence sets (A'-F') of 9 exactly DC-free length 12 sequences. Those sequences which are plesiosynchronous have parameter tau=1. This set of sequences illustrates the more general case in which the size of the sequence set can be increased by allowing non-orthogonal sequences to be part of the set. The advantage of orthogonal sequences is maintained by arranging the order that sequences appear on the disk so that adjacent sequences (in the cross-track direction) on the disk are, in fact, orthogonal. This constraint can be implemented because the sequences are predetermined and are fixed once written on the disk, which is not the case for general communications.

The sequence set C' in FIG. 3 has the interesting property that the palindrome of each sequence in the set is also in the set (within a sign). The phrase "palindromic set" will be used to describe this property. Servo patterns based on palindromic sets can be decoded even if all patterns are reversed, using the same basic read channel electronics hardware. Such a property is useful in BPM manufacture of A and B sides of the disk using the same master. (See, for example, U.S. Published Application 20080266701).

Figure 4:
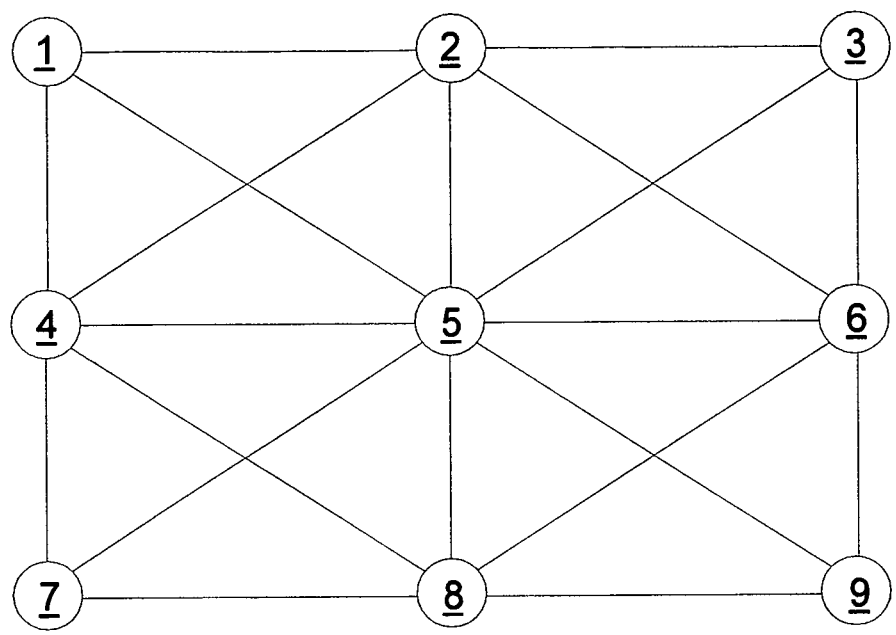
FIG. 4 is a graph illustrating the plesiosynchronous properties of the 9 sequences in set C' of FIG. 3.
Figure 9:
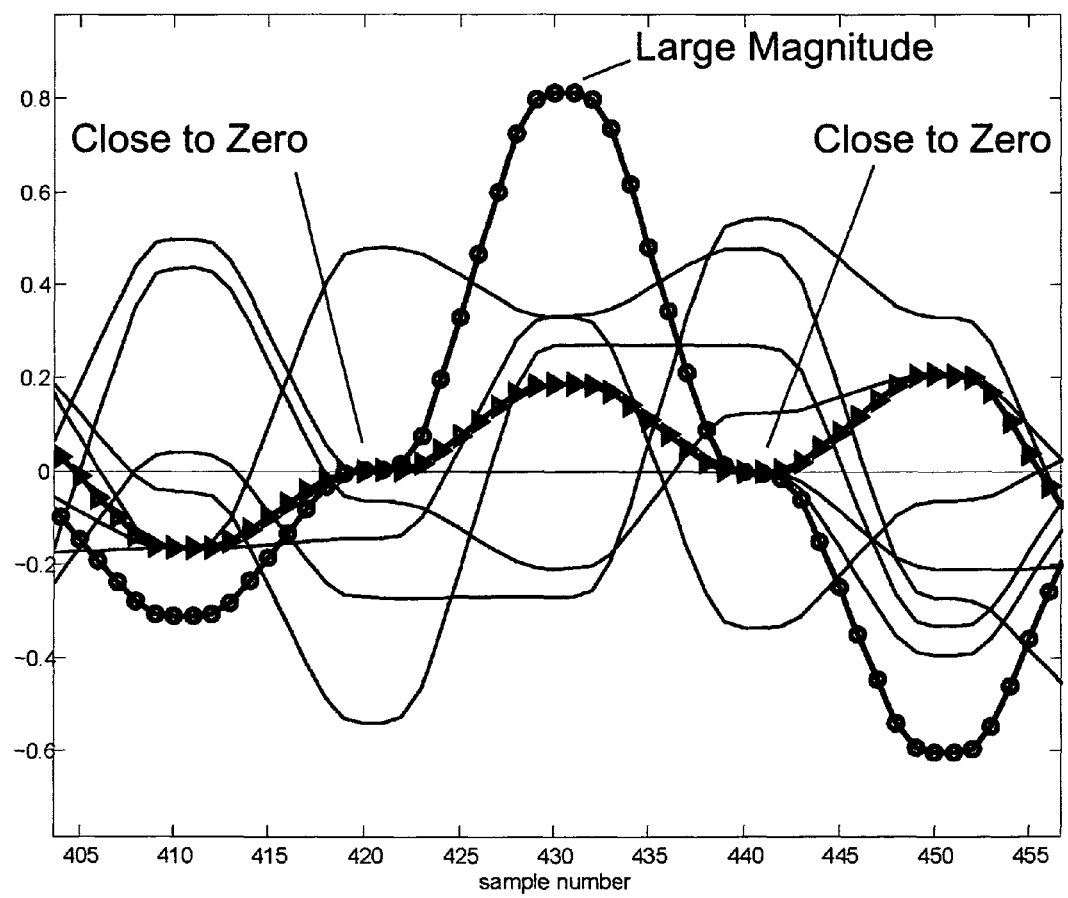
FIG. 9 illustrates filter outputs for a 9-sequence filter bank and two-sequence input according to an embodiment of the invention.

The plesiosynchronous properties of the 9 sequences in set C' of FIG. 3 are shown in the graph in FIG. 4 and labeled as 1 through 9 with 1 being the first sequence in set C' of FIGS. 3 and 9 the last one. The vertices represent the sequence, and the presence or absence of edges denotes the presence or absence of the plesiosynchronous property between the corresponding sequences.

Table 2 describes the sequence relationships for the sequences of FIG. 4 with antipodal sequences which are listed using "^" symbols. The information in Table 2 is the equivalent of a graph. A complete graph is a graph in which all vertices are connected to all other vertices by edges. There are 4 complete subgraphs of 4 sequences (e.g., sequences 1, 2, 4, and 5) which can be used in the same manner as the length 8 sequence sets of FIG. 2. The sequences are the vertices of the graph. The edges, connecting the vertices, of the graph specify which sequences may be adjacent on the disk.

However, these distinct sequence sets are connected to each other, providing new degrees of freedom and more complex disk pattern configurations than would be allowed with the 4 sets used independently. The minimum possible length of sequences (in a set of order 4) to be strictly DC-free is 12. All such sets are listed in FIG. 3.

can be adjacent have been noted above. With little loss of generality, we may consider the case in which order in which patterns appear on the disk, from track to track, is a periodic pattern of period T. Such a cyclic pattern can be drawn on a graph as a closed path which may repeat vertices, but not edges. Such a path will be called a "cycle." If an admissible cycle, for example, is 1-2-3-4-1-2-3-4-1-2-3-4 etc. and the head signal can be determined to be composed of sequences 2 and 3 of some relative amplitude, then the head must be located in the unique point in the cycle which is along the edge joining the vertices (corresponding to the sequences) 2 and 3. Fractional track information (that is, the PES) is determined by the relative amplitude of the two sequences in the signal from the read head (sensor). For example, if the two amplitudes are the same, then the head is situated halfway on the edge between vertices 2 and 3 on that cycle.

Generalizing from this example, if the head's reading width is exactly equal to the servo track pitch (one half of the data track width), we may determine (except at a finite num-

TABLE 2

Sequence Orthogonal Relationships for Length 12 Sequences from Set C' in FIG. 3.
Antipodal sequences are designated with "^" overscores.

|   | 1 | 2 | 3 | 4 | 5 | 6 | 7 | 8 | 9 | 1̂ | 2̂ | 3̂ | 4̂ | 5̂ | 6̂ | 7̂ | 8̂ | 9̂ |
|---|---|---|---|---|---|---|---|---|---|---|---|---|---|---|---|---|---|---|
| 1 |   |   | * | * |   |   |   |   |   |   | * |   |   | * | * |   |   |   |
| 2 | * |   | * | * | * | * |   |   |   |   |   | * |   | * | * | * |   |   |
| 3 |   | * |   | * | * |   |   |   |   |   | * |   |   | * | * |   |   |   |
| 4 | * | * |   |   | * |   | * | * |   | * | * |   |   | * |   |   | * | * |
| 5 | * | * | * | * |   | * | * | * | * | * | * | * |   | * |   | * | * | * |
| 6 |   | * | * |   | * |   |   | * | * | * | * |   |   | * |   |   | * | * |
| 7 |   |   |   | * | * |   |   | * |   |   |   | * | * |   |   |   | * |   |
| 8 |   |   |   | * | * | * | * |   | * |   |   | * | * | * | * |   |   | * |
| 9 |   |   |   |   | * | * |   | * |   |   |   | * | * |   | * |   |   |   |
| 1̂ |   | * |   | * |   |   |   |   |   |   |   | * |   | * | * |   |   |   |
| 2̂ | * |   | * | * | * | * |   |   |   |   |   | * |   | * | * | * |   |   |
| 3̂ |   | * |   | * | * |   |   |   |   |   | * |   |   | * | * |   |   |   |
| 4̂ | * | * |   |   | * |   | * | * |   | * | * |   |   | * |   |   | * | * |
| 5̂ | * | * | * | * |   | * | * | * | * | * | * | * |   | * |   | * | * | * |
| 6̂ |   | * | * |   | * |   |   | * | * | * | * |   |   | * |   |   | * | * |
| 7̂ |   |   |   | * | * |   |   | * |   |   |   | * | * |   |   |   | * |   |
| 8̂ |   |   |   | * | * | * | * |   | * |   |   | * | * | * | * |   |   | * |
| 9̂ |   |   |   |   | * | * |   | * |   |   |   | * | * |   | * |   |   |   |

The exposition thus far illustrates the tradeoffs between the number of sequences available for use, and the complexity (that is, the length) of the sequences. Table 3 shows that the tradeoff also involves the plesiosynchronous parameter, tau. Table 3 shows the maximum order M of fully mutually plesiosynchronous sets as a function of the sequence length L and parameter tau.

TABLE 3

Maximum order of complete-graph sequence sets as
a function of the sequence length L and plesiosynchronous
parameter tau as found by exhaustive computer search.

| L | tau = 1 | tau = 2 | tau = 3 | tau = 4 |
|---|---------|---------|---------|---------|
| 4 | — | — | — | — |
| 8 | 2 | — | — | — |
| 12 | 4 | 2 | — | — |
| 16 | 6 | 3 | 2 | — |
| 20 | 8 | 4 | 3 | — |
| 24 |   | 5 | 4 | 2 |

Encoding of Digital Data and PES By Multiple Sequences

Specific embodiments for the pattern of sequences as laid out on the disk to encode track-ID data and PES will now be described. Examples of the restrictions on which sequences ber of singular points on the cycle) both the integral and the fractional location of the head, modulo with length of the cycle T. The fractional error signal (the PES) will be discussed further below.

It is advantageous to maximize the cycle length T, which has the effect of increasing the number of effective track or sector ID bits in a single measurement. This problem is equivalent to the well-known problem of finding an Eulerian cycle on the graph, that is, a cycle which uses every edge exactly once. By the Euler cycle theorem, it is possible to show that there always exists a cycle of length 2*N*(N−1) for a complete graph of N sequences and N antipodal sequences. For example, where N=4, there is a length 24 cycle. The effective number of track or sector bits which can be achieved with a complete set of N sequences is approximately 1+2 log 2 (N).

In the case where 3 sequences exist in the read signal, the graph does not encompass all constraints which need to be applied to the physical system. In particular, the 1st and 3rd of 3 adjacent sequences cannot be antipodal. This extra constraint is typically quite weak; for example, it is easy to show that length 24 Eulerian cycles exist on the graph which obey this additional constraint.

Similar considerations apply to more complex examples, such as systems based on mixed sequence sets such as those depicted in FIG. 4. There exist 80-length Eulerian cycles on this graph, yielding approximately 6.4 effective digital bits available for track or sector ID. A complete-graph sequence set of order 7 is required to exceed this number of effective bits. Such sequence sets exist (as shown in Table 3), however, those sequences are longer and/or more complex.

Position Error Signal (PES)

The PES for fractional track positioning of the head in embodiments of the invention is obtained from signal amplitudes from two or more sequences. In the embodiment of FIG. 1A, the head's reading width is larger than the (cross track) width of a sequence written on the disk but smaller than twice the width of a sequence. In this case, depending on the relative location of the read head and the written track edges, the read head signal always contains a nominally-linear combination of two or three sequences from adjacent tracks. The fractional part of the track number (that is, the PES) is proportional to $(|V1|-|V2|)/+|V2|)$, where V1 and V2 are the signal amplitudes read from adjacent sequences and the absolute values are necessary because antipodal versions of the sequences may be present.

If the head's reading width is positioned over 3 sequences, and the middle sequence amplitude is V2, then the PES is proportional to $(|V1|-|V3|)/(|V1|+|V2|+|V3|)$. Alternative PES calculations are possible. If the head is over two sequences, then location detection defaults to the algorithm outlined above. In either case, the two or three amplitudes fully determine the location on the cycle.

Alternative embodiments can use multiple fields in a single wedge. An example of a dual-field system is illustrated in FIG. 1B. In this example, the sequences in the two fields are each as wide as the data track width but are written in tandem sequence along the tracks (down-track direction), which extend horizontally in the figure. In this embodiment the second sequence field (Sequences B & D on the right) are positioned one half of a data track width offset (out of phase) with the corresponding sequences A & C (with respect to the cross track direction). As an example, assume that the read head reading width is approximately equal to the data track width and the disk is rotating under the read head from right to left. If the head is centered over track N+1, the read path passes directly over the Sequence C field on the left and then straddles Sequences B &D on the right. In this type of embodiment, there will be either 1 or 2 sequences under the head at one time. If the head reads one sequence in the first field, for example, then the head typically can read two adjacent sequences in the second field. Similarly if the head is aligned with respect to the boundaries so that only one sequence in the second field is read, then two sequences can be read from the first field. This one half data track offset arrangement mimics the standard quad-burst PES arrangement of the prior art sufficiently to allow standard PES calculations to work in the case when two adjacent fields are read. When the head is not centered on either field, the head might read two adjacent sequences in each field. This embodiment is easily configurable to mimic the characteristics of prior art PES systems because the amplitude of the signal read for adjacent field tells the servo system where the head is in relation to center of the data track in the same way that the amplitude of the signals read from quad-burst PES do.

Distributing Track and Sector ID Information in Multiple Fields

It is clear from the discussion above, that the number of sequences required to span an entire drive in a single period T can be very large, because the number of tracks on each disk in an HDD is currently in the many hundreds of thousands. An efficient method to increase the effective number of track or sector bits is to distribute the required information into multiple fields. It is possible to share information between multiple fields in a servo wedge, or to share information fields in multiple servo wedges (or both). In this section, two examples of these techniques are given.

In the first example, single fields are used in each wedge and track-ID information is distributed across 4 adjacent wedges. Alternatively the 4 fields could be included in a each wedge with a significant increase in the area taken up by sequences. In this example only track-ID information will be shown, but sector-ID information can be added using the same concepts.

The 4 consecutive wedge distribution system is appropriate when the head's reading width is known to be sufficiently larger than the servo track pitch (typically one-half the width of a data track). In this embodiment the full track-ID is recovered by reading 4 consecutive fields and uniquely mapping the sequences from the 4 fields to the expected track-ID. In this embodiment a Chinese Remainder Theorem (CRT) mapping is used, but other mappings can be used to transform a set of sequences read in one or more servo wedges into a track-ID. For example, a table lookup method could map an ordered set of sequences into a track-ID, sector ID or other desired information.

Figure 5:
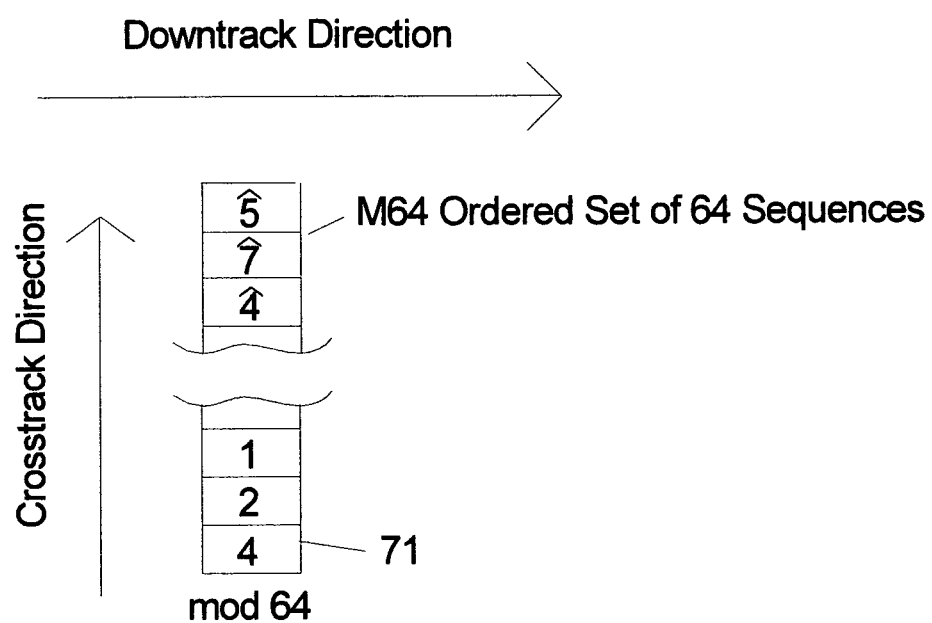
FIG. 5 illustrates a sample disk pattern for a servo wedge in a distributed track-ID embodiment of the invention.
Figure 6:
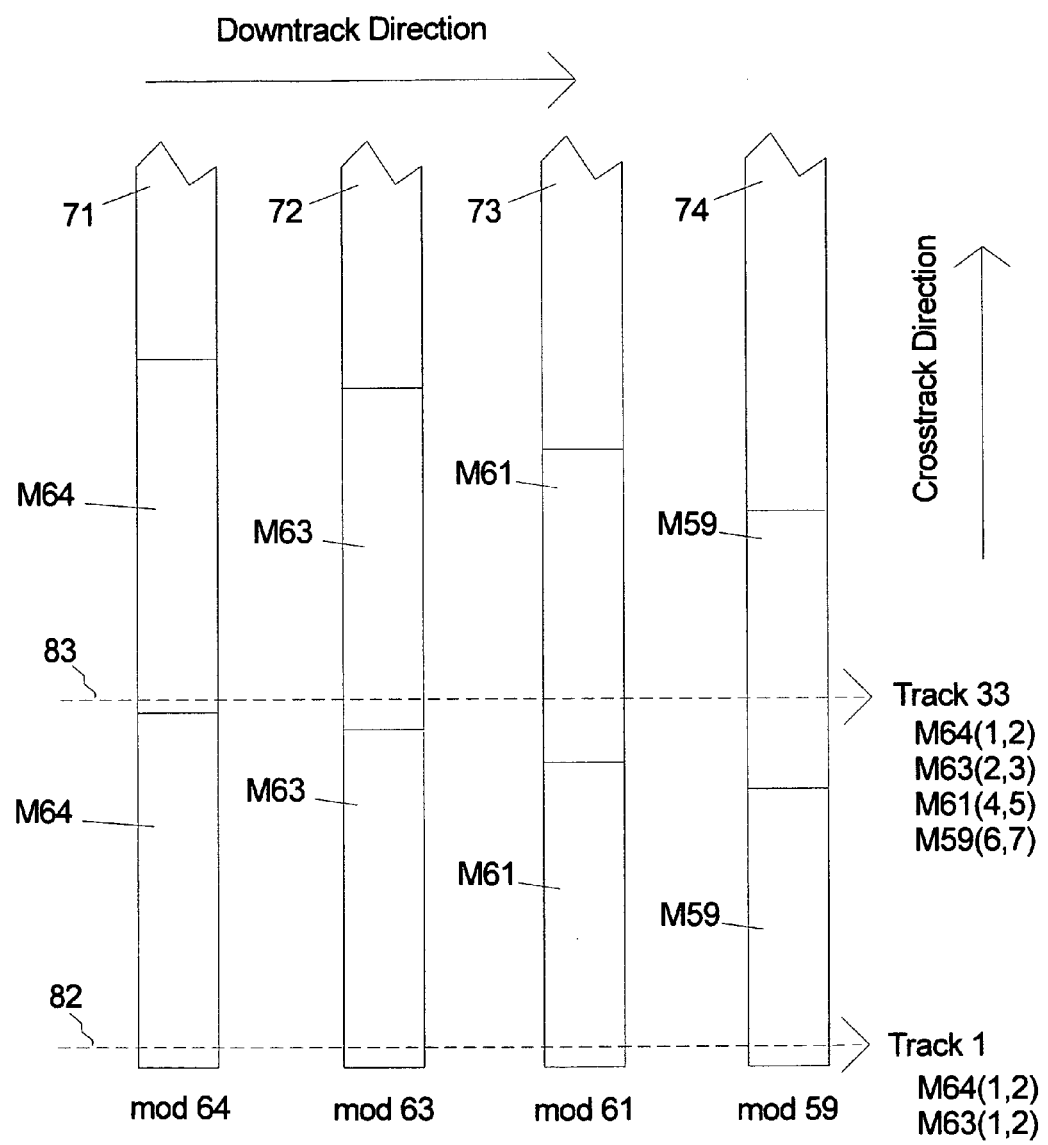
FIG. 6 illustrates the disk patterns for a 4-wedge distributed track-ID embodiment of the invention using a Chinese Remainder Theorem encoding.

FIG. 5 illustrates the arrangement of a cycle of 64 sequences M64 in a first servo wedge 71 of the set of four wedges. Each sequences is one half the width of the data track; thus there are two sequences per track. FIG. 6 illustrates the set of four servo wedges 71, 72, 73, 74. In this illustration (which is not drawn to scale) only selected servo fields are shown and the data which would be recorded between the servo fields is not shown. Multiple tracks are represented in the cross-track direction which is vertical in the figure. The disk patterns in FIG. 6 are repeated from ID to OD. For servo wedge 71 a cycle of 64 sequences M64 repeats in the cross track direction. For servo wedge 72 a cycle of 63 sequences M63 is repeated. For servo wedge 73 a cycle of 61 sequences M61 is repeated. For servo wedge 74 a cycle of 59 sequences M59 is repeated.

A set of 4 cycles M64, M63, M61, M59 is shown in FIG. 7 which are based on the length 12 sequences in sequence set C' of FIG. 3 and their antipodal sequences which are represented by the "^" symbol. There are a total of 18 allowed sequences. These cycles have the property that any 3 adjacent sequences are mutually different and plesiosynchronous.

A Chinese Remainder Theorem (CRT) mapping is used which guarantees uniqueness and is implemented by means of the set of 4 cycles shown in FIG. 7, each of differing periods T=64, 63, 61 and 59 (corresponding to M64, M63, M61, M59) which are relatively prime to each other. The resulting system identifies the integral portion of the track-ID (modulo Ti), with i=1,2,3,4, and by the uniqueness part of the Chinese Remainder Theorem (CRT), recovers the entire track-ID modulo 64*63*61*59=14511168 servo tracks, which is sufficiently large for current HDDs. Note that in this example two servo tracks exist for each data track.

As an example, assume that the head is reading along the path 82 shown in FIG. 6, which is assumed to be centered on the 1st data track from the bottom of the figure. In servo wedge 71, the head will read the 1st pair of sequences in cycle M64, which are represented by the notation M64(1,2). Similarly in servo wedges 72, 73, 74 the head will also read the 1st pair of sequences in cycles M63, M61, and M59. One conceptually simple implementation could use a table to translate the four pairs of sequences into a track number, but calculations as described above may be preferable.

For comparison when the head is reading along the path 83 shown in FIG. 6, it is assumed to be centered on the 33rd data track from the bottom of the figure. In servo wedge 71, the head will the 1st pair of sequences in cycle M64, which are again M64(1,2). But in servo wedge 72 the head will read the 2nd and 3rd sequences in cycles M63=M63(2,3), because cycle M63 is one sequence shorter than M64. It follows that in servo wedge 73 the head will read the sequences M61(4,5), and in servo wedge 74 the head will read the sequences M59(6,7). Thus, the set of sequences uniquely corresponding to each track is systematically determined. A location identifier decoder that implements a method as defined above will described as using a Chinese remainder solver.

Sector Identification

Only track-ID numbers are mentioned above, but the concepts of the invention can be extended to include sector identifiers. Sector encoding can be achieved in several ways. There can be hundreds of sectors per track. One method is to use a second group of filters to decode one of the other sets of sequences shown in FIG. 3, for example. A given servo wedge could utilize either sequence set C' or sequence set D' to encode a sector bit of '0' or '1' respectively.

As another alternative, sequences can be stolen from the cycle for that servo wedge. For example, one can encode the sector using the antipodal sequence of the first sequence field. A second method is to use antipodal sequences to encode the sector bit rather than utilizing the antipodal sequences to construct longer cycles. More efficiently, one can use two different graphs for the first sequence. Here the key is that there is a method to encode 1 bit of information for each servo wedge that can be used for a distributed sector identifier (regardless of distribution method). In this embodiment, two sequences are used to generate two different STMs to encode this bit. A third method introduces another STM type to encode the sector bit for a given servo wedge. Prior art devices use a similar technique by utilizing two different STM patterns. However, the method by which the STM is encoded is different from the prior art. The graph type encodes the sector bit. For example, referring to FIG. 4, the STM1 graph could use nodes +/−1, +/−2, +/−4 and +5. The STM2 graph could use nodes +/−6, +/−8, +/−9 and −5.

Signal Processing and Detection of the Integrated Servo Fields

A preferred embodiment takes advantage of the orthogonality constraints of the design to detect the STM, the sequences, and the amplitude of the sequences by means of a matched filter. In a matched-filter detection system, each sequence determines both the pattern on the disk (which in this case will be a cyclic extension of the sequence) and the correlation filter used to detect the presence of that sequence. These sequence sets have fast algorithms to determine the multiple outputs of the analysis filter bank from the single input representing the head signal.

Figure 8:
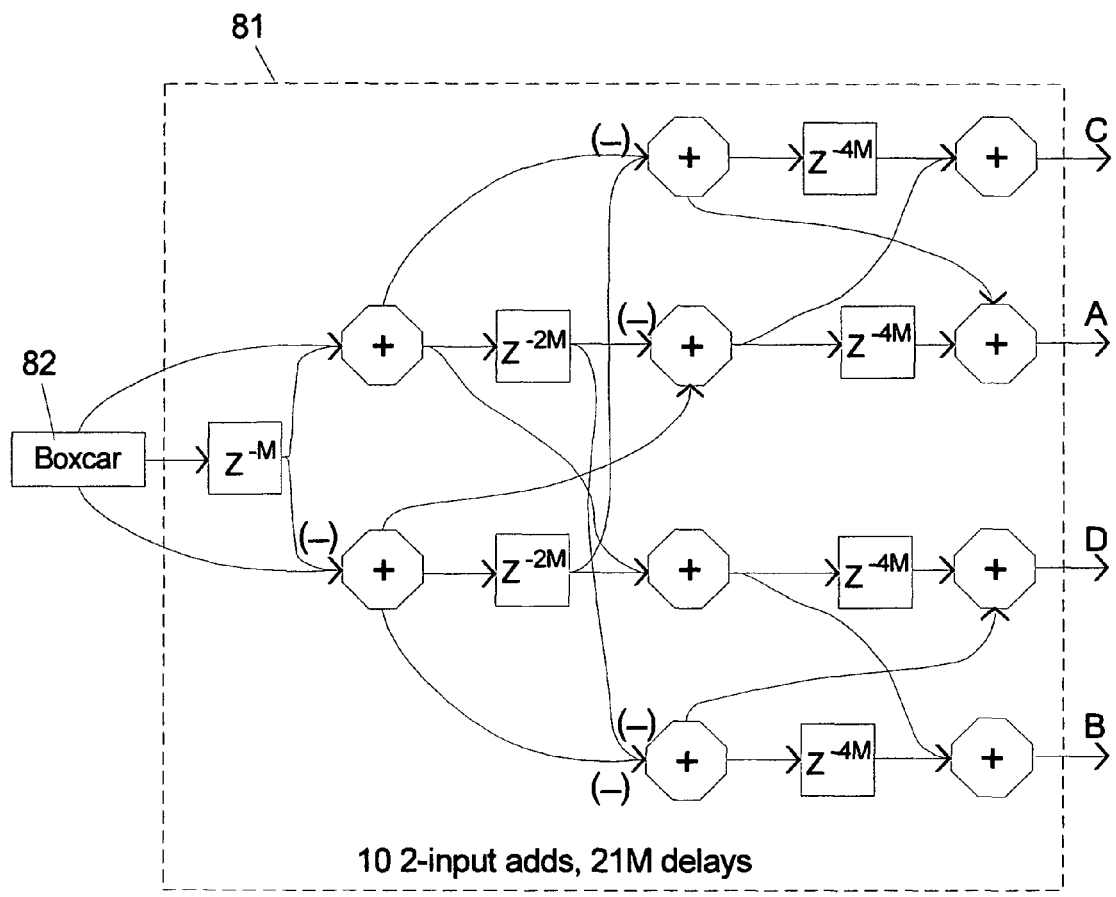
FIG. 8 illustrates an example filter bank according to an embodiment of the invention.

FIG. 8 shows an example filter bank 81 implementing a fast algorithm for a sequence set (sequences 21, 22, 23, 24) in FIG. 2 in which each component of the sequence (+1 or −1) on the disk is sampled M times, with a boxcar accumulator 82 to average the M results. The output labeled A corresponds to sequence 21, output B corresponds to sequence 22, output C corresponds to sequence 23, and output D corresponds to sequence 23, The complexity of the resulting filter bank is essentially dominated by the delay elements. There are 10 2-input adds and 21M delays. Similarly simple filter-bank implementations are possible with more-complex sequences sets of the types considered above.

FIG. 9 shows the output of the matched filter bank for the 9-sequence version in which the head signal contains a linear combination of a maximum of two sequences, corresponding to the filter outputs graphed with lines with triangles and circles. The resulting information (which sequences are detected, and their amplitude) gives track or sector ID information as well as PES. An example STM detection rule is: find a location with sufficient total absolute amplitude in which the amplitude of each filter output is sufficiently close to zero (see labeled points in FIG. 9) on either side of the maximum. The second constraint is helpful to reduce false STMs and comes from the plesiosynchronous tau parameter.

Figure 10:
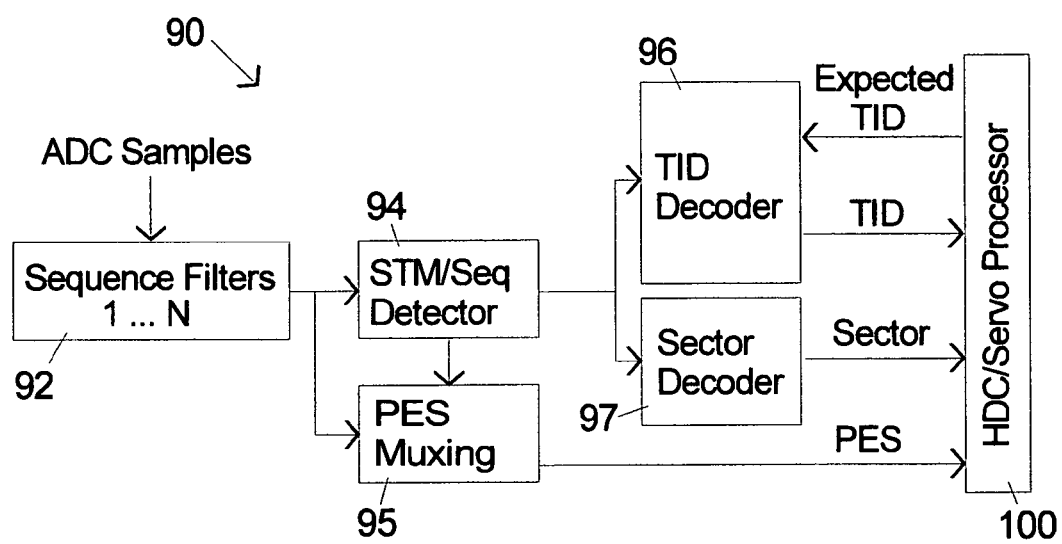
FIG. 10 is a block diagram illustrating a servo system according to an embodiment of the invention.

FIG. 10 is a block diagram illustrating a servo system 90 according to an embodiment of the invention. A plurality of sequence filters 92 as described above detect the presence of the predetermined sequences in the input data stream. The input for the sequence filters 92 are analog-to-digital converter (ADC) samples from the Read Channel (not shown) which processes the signal from the head. The STM/Seq Detector 94 uses the output from the sequence filters 92 and supplies signals to the location identifier decoders: TID Decoder 96 and the Sector Decoder 97. The PES Muxing unit 95 uses the output from the sequence filters 92 as well as a signal from the STM/Seq Detector 94. The Hard Disk Controller (HDC)/Servo Processor 100 supplies an expected TID to the TID Decoder 96, which in turn supplies the actual TID to the HDC/Servo Processor 100. The Sector Decoder 97 supplies the sector ID to the HDC/Servo Processor 100. The PES signal for HDC/Servo Processor 100 comes from the PES Muxing unit 95, which uses the output from the sequence filters 92 as well as a signal from the STM/Seq Detector 94.

While the invention has been illustrated with reference to the embodiments, it will be understood by those skilled in the art that various changes in form and detail may be made without departing from the spirit and scope of the invention. Accordingly, the disclosed embodiments of the invention are merely illustrative and not intended to limit the scope of the invention as specified in the appended claims.

The invention claimed is:

1. An information storage system comprising:
   a disk with a plurality of prerecorded servo fields arranged in servo wedges, each servo field including at least one sequence of a plurality of encoded bits which is a member of a predetermined set of permissible sequences that includes at least four unique sequences, the sequences being arranged in patterns that encode location identifiers with an ordered set of sequences that includes at least two sequences defining an integer location identifier and the ordered set of sequences defining the location identifier being distributed across at least two servo wedges, the set of permissible sequences including sequences that are mutually mathematically orthogonal and sequences that are not mutually mathematically orthogonal and the sequences being arranged in patterns so that sequences that are adjacent in a cross-track direction are mathematically orthogonal;
   a read head which generates a signal created by the sequences passing under the read head when the disk is rotating; and
   a servo system comprising:
   a set of filters that includes a corresponding filter for detecting each sequence in the set of sequences in the signal; and
   a location identifier decoder that uses at least two sequences from at least two servo wedges detected by the filters to derive the location identifier.

2. The information storage system of claim 1 wherein the ordered set of sequences defining the location identifier includes a first pair of sequences in a first servo wedge that represents a first remainder value of the location identifier modulo a first predetermined number.

3. The information storage system of claim 2 wherein the ordered set of sequences defining the location identifier includes a second pair of sequences in a second servo wedge that represents a second remainder value of the track identifier modulo a second predetermined number.

4. The information storage system of claim 3 wherein the first and second predetermined numbers are relatively prime to each other.

5. The information storage system of claim 4 wherein the location identifier decoder uses at least first and second remainder values and a Chinese remainder solver to determine the location identifier.

6. The information storage system of claim 1 wherein the ordered set of sequences defining the location identifier includes a first pair of sequences in a first servo wedge that represents a first remainder value of the location identifier modulo a first predetermined number and a second pair of sequences in a second servo wedge that represents a second remainder value of the location identifier modulo a second predetermined number and wherein the first and second pairs of sequences are repeated in a cyclic pattern radially distributed across the disk.

7. The information storage system of claim 1 wherein there are at least two sequences in each servo wedge for each data track that are positioned side-by-side in a cross-track direction and each of the two sequences is one-half as wide as the data track.

8. The information storage system of claim 1 wherein there are at least two sequences in each servo wedge for each data track that are positioned in tandem in a down-track direction along the data track, each of the two sequences is approximately as wide as the data track, and one of the two sequences is offset by one-half of a width of the data track in the cross-track direction.

9. The information storage system of claim 1 wherein the servo system further comprises means for generating a servo track mark signal using detection of sequences by the set of filters.

10. The information storage system of claim 1 wherein the servo system further comprises means for detecting first and second signal amplitudes corresponding to first and second sequences in the signal to generate a position error signal to position the read head over a selected data track.

11. The information storage system of claim 1 wherein the set of permissible sequences is mutually plesiosynchronous.

12. The information storage system of claim 1 wherein the predetermined set of permissible sequences consists of a first subset of sequences containing no antipodal sequences and a second subset of sequences that are antipodal to sequences in the first subset and wherein each sequence in the first subset is mathematically orthogonal to all other sequences in the first subset.

13. An information storage system comprising:
   a disk with a plurality of prerecorded servo fields arranged in servo wedges, each servo field including at least one sequence of a plurality of encoded bits which is a member of a predetermined set of permissible sequences that include at least four unique sequences and that include sequences that are mutually mathematically orthogonal and sequences that are not mutually mathematically orthogonal, the sequences being arranged in patterns that encode integer location identifiers with an ordered set of sequences including at least two sequences defining a location identifier and the ordered set of sequences defining the location identifier being distributed across at least two servo wedges;
   a read head which generates a signal created by the sequences passing under the read head when the disk is rotating; and
   a servo system comprising:
   a set of filters that includes a filter for detecting each sequence in the set of sequences in the signal; and
   a location identifier decoder that uses at least two sequences from at least two servo wedges detected by the set of filters to derive the integer location identifier.

14. The information storage system of claim 13 wherein the ordered set of sequences defining the location identifier includes a first pair of sequences in a first servo wedge that represents a first remainder value of the location identifier modulo a first predetermined number and a second pair of sequences in a second servo wedge that represents a second remainder value of the location identifier modulo a second predetermined number.

15. The information storage system of claim 14 wherein the first and second predetermined numbers are relatively prime to each other and wherein the location identifier decoder uses at least first and second remainder values and a Chinese remainder solver to determine the location identifier.

16. The information storage system of claim 13 wherein the ordered set of sequences defining the location identifier includes a first pair of sequences in a first servo wedge and a second pair of sequences in a second servo wedge and wherein the first and second pairs of sequences are repeated in a cyclic pattern in servo wedges radially distributed across the disk.

17. The information storage system of claim 13 wherein there are at least two sequences in each servo wedge for each data track that are positioned side-by-side in a cross-track direction and each of the two sequences is one-half as wide as the data track.

18. The information storage system of claim 13 wherein there are at least two sequences in each servo wedge for each data track that are positioned in tandem in a down-track direction along the data track, each of the two sequences is approximately as wide as the data track, and one of the two sequences is offset by one-half of a width of the data track in the cross-trackdirection.

19. The information storage system of claim 13 wherein the sequences are arranged in patterns so that sequences that are adjacent in a cross-track direction are mathematically orthogonal.

* * * * *